(12) United States Patent
Aota et al.

(10) Patent No.: US 8,507,118 B2
(45) Date of Patent: Aug. 13, 2013

(54) SECONDARY BATTERY AND FABRICATION METHOD THEREOF

(75) Inventors: Kinya Aota, Hitachi (JP); Toshiro Fujita, Kasumigaura (JP)

(73) Assignee: Hitachi Vehicle Energy, Ltd, Ibaraki (JP)

( * ) Notice: Subject to any disclaimer, the term of this patent is extended or adjusted under 35 U.S.C. 154(b) by 175 days.

(21) Appl. No.: 13/211,401

(22) Filed: Aug. 17, 2011

(65) Prior Publication Data

US 2012/0058374 A1 Mar. 8, 2012

(30) Foreign Application Priority Data

Sep. 3, 2010 (JP) ................................ 2010-197854

(51) Int. Cl.
*H01M 4/00* (2006.01)
*H01M 6/00* (2006.01)

(52) U.S. Cl.
USPC ............. 429/94; 429/178; 429/179; 429/181; 429/175; 29/623.2

(58) Field of Classification Search
USPC ................... 429/94, 163, 175, 176, 178, 179, 429/180, 181, 185, 211; 29/623.1, 623.5; 219/121.64
See application file for complete search history.

(56) References Cited

U.S. PATENT DOCUMENTS

| | | | | |
|---|---|---|---|---|
| 4,357,398 A | * | 11/1982 | Nelson et al. | 429/94 |
| 8,268,021 B2 | * | 9/2012 | Yoshida et al. | 29/623.1 |
| 2003/0157404 A1 | | 8/2003 | Inoue et al. | |
| 2004/0061476 A1 | * | 4/2004 | Nakamaru et al. | 320/107 |
| 2008/0241679 A1 | | 10/2008 | Okutani et al. | |
| 2009/0087737 A1 | | 4/2009 | Yamauchi et al. | |
| 2011/0008661 A1 | | 1/2011 | Kozuki et al. | |
| 2011/0045345 A1 | | 2/2011 | Tsuchiya et al. | |
| 2012/0052380 A1 | | 3/2012 | Nakamura | |
| 2012/0270098 A1 | | 10/2012 | Yamauchi et al. | |

FOREIGN PATENT DOCUMENTS

| | | |
|---|---|---|
| JP | 62-254992 | 11/1987 |
| JP | 62-283554 A | 12/1987 |
| JP | 04-230953 A | 8/1992 |
| JP | 2000-090893 A | 3/2000 |
| JP | 2002-100340 A | 4/2002 |

(Continued)

OTHER PUBLICATIONS

JP office action of Appln. No. 2010-197854 dated Dec. 4, 2012 with English translation.

*Primary Examiner* — Raymond Alejandro
(74) *Attorney, Agent, or Firm* — Antonelli, Terry, Stout & Kraus, LLP.

(57) ABSTRACT

A secondary battery includes: a jelly roll that includes a positive and a negative electrode wound via a separator; a case; a lid; and electrically conductive input/output members, wherein: the electrically conductive input/output members include, at least; a positive and a negative electrode current collector plate with one end thereof connected to the positive and the negative electrode respectively; a positive and a negative electrode external conductive member with one end thereof connected to another end of the positive and the negative electrode current collector plate respectively and another end thereof extending to an outer side of the lid; the one end of the positive and the negative electrode external conductive member are respectively swage-fused to the other end of the positive and the negative electrode current collector plate; and an oxide layer is formed at a surface of each swage-fused area.

11 Claims, 19 Drawing Sheets

(56) References Cited

FOREIGN PATENT DOCUMENTS

| | | |
|---|---|---|
| JP | 2003-092103 A | 3/2003 |
| JP | 2004-014173 A | 1/2004 |
| JP | 2008-251411 A | 10/2008 |
| JP | 2009-087693 A | 4/2009 |
| JP | 2009-259524 | 11/2009 |
| JP | 2009-283256 A | 12/2009 |
| JP | 2012-054038 A | 3/2012 |
| WO | WO 2009/110250 A1 | 9/2009 |

* cited by examiner

SECONDARY BATTERY AND FABRICATION METHOD THEREOF

INCORPORATION BY REFERENCE

The disclosure of the following priority application is herein Incorporated by reference:
Japanese Patent Application No. 2010-197854 filed Sep. 3, 2010

BACKGROUND OF THE INVENTION

1. Field of the Invention

The present invention relates to a secondary battery such as a lithium secondary battery and a fabrication method through which the secondary battery is manufactured.

2. Description of Related Art

Among lithium secondary batteries with large capacities (Wh) developed in recent years as motive power sources in hybrid vehicles, electric vehicles and the like, particularly intense interest is focused on prismatic lithium secondary batteries assuring high energy density (Wh/kg).

A prismatic lithium secondary battery includes a flat jelly roll constituted with a winding assembly of a positive electrode formed by coating a positive foil with a positive active material, a negative electrode formed by coating a negative foil with a negative active material and a separator that prevents contact between the positive electrode and the negative electrode. The jelly roll, which is housed in a case, and a positive electrode connector terminal and a negative electrode connector terminal disposed at a lid so as to be exposed to the outside are electrically connected with the jelly roll via current collector plates. The case and the lid are welded together and thus sealed and after an electrolyte is injected through an injection opening located at the lid, the injection opening is sealed through welding.

Japanese Laid Open Patent Publication No. 2009-259524 discloses a battery manufactured by inserting a cylindrical connector terminal via through holes formed at an external terminal, an insulating member, a lid and a gasket respectively, locking the individual members through swaging onto the connector terminal which is widened toward the outer circumferential side from its central axis and fusing the outer circumferential edge of the swaged portion of the connector terminal with the external terminal through spot laser welding.

Japanese Laid Open Patent Publication No. S 62-254992 discloses an aluminum laser welding method implemented in an oxygen-containing atmosphere, which assures a greater penetration depth of weld achieved by lowering the reflection rate with which the laser beam is reflected, via an oxide layer.

SUMMARY OF THE INVENTION

There is an issue yet to be optimally addressed with regard to the battery disclosed in Japanese Laid Open Patent Publication No. 2009-259524 in that when the outer circumferential edge of the swaged portion is welded, the melted outer circumferential edge of the swaged portion may wet spread over the surface of the outer terminal and cracking may occur due to the tensile residual stress manifesting as the melted material solidifies.

The laser welding method disclosed in Japanese Laid Open Patent Publication No. S 62-254992 does not factor in, in any way whatsoever, wet spreading of a weld pool occurring at a staged portion such as a swaged portion.

According to the 1st aspect of the present invention, a jelly roll that includes a positive electrode and a negative electrode wound via a separator; a case housing the jelly roll; a lid that seals the case; and electrically conductive input/output members via which charge/discharge power is input and output between the jelly roll and an external load, wherein: the electrically conductive input/output members include, at least; a positive electrode current collector plate with one end thereof connected to the positive electrode; a negative electrode current collector plate with one end thereof connected to the negative electrode; a positive electrode external conductive member with one end thereof connected to another end of the positive electrode current collector plate and another end thereof extending to an outer side of the lid; a negative electrode external conductive member with one end thereof connected to another end of the negative electrode current collector plate and another end thereof extending to the outer side of the lid; the one end of the positive electrode external conductive member and the one end of the negative electrode external conductive member are respectively swage-fused to the other end of the positive electrode current collector plate and the other end of the negative electrode current collector plate; and an oxide layer is formed at a surface of each swage-fused area.

According to the 2nd aspect of the present invention, the oxide layer of a secondary battery according to the 1st aspect may assume a film thickness required to minimize wettability of a molten metal at the swage-fused area.

According to the 3rd aspect of the present invention, it is preferred that in a secondary battery according to the 1st aspect, the one end of the swage-fused positive electrode external conductive member and the one end of the swage-fused negative electrode external conductive member each include a staged portion passing through the positive electrode current collector plate or the negative electrode current collector plate and projecting out through a surface of the positive electrode current collector plate or the negative electrode current collector plate; and the positive electrode external conductive member is fused with the positive electrode current collector plate at the staged portion and the negative electrode external conductive member is fused with the negative electrode current collector plate at the staged portion, with the oxide layer formed at the surface of each swage-fused area.

According to the 4th aspect of the present invention, it is preferred that in a secondary battery according to the 1st aspect, the positive electrode external conductive member includes; a positive electrode connector terminal with one end thereof swage-fused to the positive electrode current collector plate; and a positive electrode external terminal disposed on the outer side of the lid, with another end thereof passing through the positive electrode external terminal and the positive electrode connector terminal swage-fused with the positive electrode external terminal; the negative electrode external conductive member includes; a negative electrode connector terminal with one end thereof swage-fused to the negative electrode current collector plate; and a negative electrode external terminal disposed on the outer side of the lid, with another end thereof passing through negative electrode external terminal and the negative electrode connector terminal swage-fused with the negative electrode external terminal; and the oxide layer is formed at the surface of each swage-fused area where the positive or negative electrode connector terminal is swage-fused with the positive or negative external terminal.

According to the 5th aspect of the present invention, it is preferred that in a secondary battery according to the 4th aspect, the other end of the swage-fused positive electrode connector terminal and the other end of the swage-fused negative electrode connector terminal each include a staged portion projecting out through a surface of the positive electrode external terminal or the negative electrode external terminal; and the positive electrode connector terminal is fused with the positive electrode external terminal at the staged portion and the negative electrode connector terminal is fused with the negative electrode external terminal at the staged portion, with the oxide layer formed at the surface of each swage-fused area.

According to the 6th aspect of the present invention, the other end of the positive electrode external conductive member and the other end of the negative electrode external conductive member of a secondary battery according to the 1st aspect may be each a terminal connected with the external load.

According to the 7th aspect of the present invention, the surface of the swage-fused area of a secondary battery according to the 1st aspect may assume a projecting shape.

According to the 8th aspect of the present invention, a secondary battery comprises: a jelly roll that includes a positive electrode and a negative electrode wound via a separator; a case housing the winding back; a lid that seals the case; and electrically conductive input/output members via which charge/discharge currents are input and output between the jelly roll and an external load, wherein: the electrically conductive input/output members include, at least; a positive electrode current collector plate with one end thereof connected to the positive electrode; a negative electrode current collector plate with one end thereof connected to the negative electrode; a positive electrode connector terminal with one end thereof connected to the positive electrode current collector plate; a negative electrode connector terminal with one end thereof connected to the negative electrode current collector plate; and a positive electrode external terminal disposed on an outer side of the lid, which is swage-fused with the positive electrode connector terminal with another end of the positive electrode connector terminal passing through the positive electrode external terminal and a negative electrode external terminal disposed on the outer side of the lid, which is swage-fused with the negative electrode connector terminal with another end of the negative electrode connector terminal passing through the negative electrode external terminal; and an oxide layer is formed at a surfaces of each swage-fused area where the positive or negative electrode connector terminal is swage-fused to the positive or negative electrode external terminal.

According to the 9th aspect of the present invention, it is preferred that in a secondary battery according to the 8th aspect, the other end of the swage-fused positive electrode connector terminal and the other end of the swage-fused negative electrode connector terminal each include a staged portion projecting out through a surface of the positive electrode external terminal or the negative electrode external terminal; and the positive electrode connector terminal is fused with the positive electrode external terminal at the staged portion and the negative electrode connector terminal is fused with the negative electrode external terminal at the staged portion, with the oxide layer formed at the surface of each swage-fused area.

According to the 10th aspect of the present invention, the surface of the swage-fused area of a secondary battery according to the 8th aspect may assume a projecting shape.

According to the 11th aspect of the present invention, a secondary battery fabrication method through which a secondary battery according to the 1st aspect is manufactured, comprises: a welding step in which the swage-fused area is formed through laser welding executed within an atmosphere containing oxygen with an oxygen concentration of 10% or higher.

According to the 12th aspect of the present invention, welding target members of a secondary battery fabrication method according to the 11th aspect may be exposed to air while undergoing laser welding in the welding step.

According to the 13th aspect of the present invention, it is preferred that a secondary battery fabrication method according to the 11th aspect comprises: a first step in which the jelly roll is manufactured by winding the positive electrode and the negative electrode via the separator; a second step in which the positive electrode connector terminal and the negative electrode connector terminal are respectively swaged with the positive electrode current collector plate and the negative electrode current collector plate used to connect the positive electrode and the negative electrode to the positive electrode external terminal and the negative electrode external terminal respectively; a third step in which the positive electrode connector terminal and the negative electrode connector terminal are respectively swaged with the positive electrode external terminal and the negative electrode external terminal; a fourth step in which the positive electrode current collector plate and the negative electrode current collector plate are respectively connected to the positive electrode and the negative electrode; a fifth step in which swaging portions formed through the second step are welded in an oxygen-containing atmosphere with a specific oxygen concentration; a sixth step in which swaging portions formed through the third step are welded in an oxygen-containing atmosphere with a specific oxygen concentration; a seventh step in which a lid assembly is manufactured by connecting the lid-terminal assembly to the jelly roll, with the positive and negative electrode current collector plates, the positive and negative electrode connector terminals and the positive and negative electrode external terminals of the lid-terminal assembly having been integrated through the third through sixth steps; an eighth step in which the lid assembly is housed within a case that includes an opening; a ninth step in which the opening is covered with the lid to seal the case; and a tenth step in which an electrolyte is poured into the case.

According to the present invention, an occurrence of defective welding attributable to wet spreading of molten metal, manifesting specifically in a staged portion, can be prevented.

DESCRIPTION OF PREFERRED EMBODIMENT

An embodiment of the secondary battery according to the present invention is described in reference to drawings.

(Overall Structure)

Figure 1:
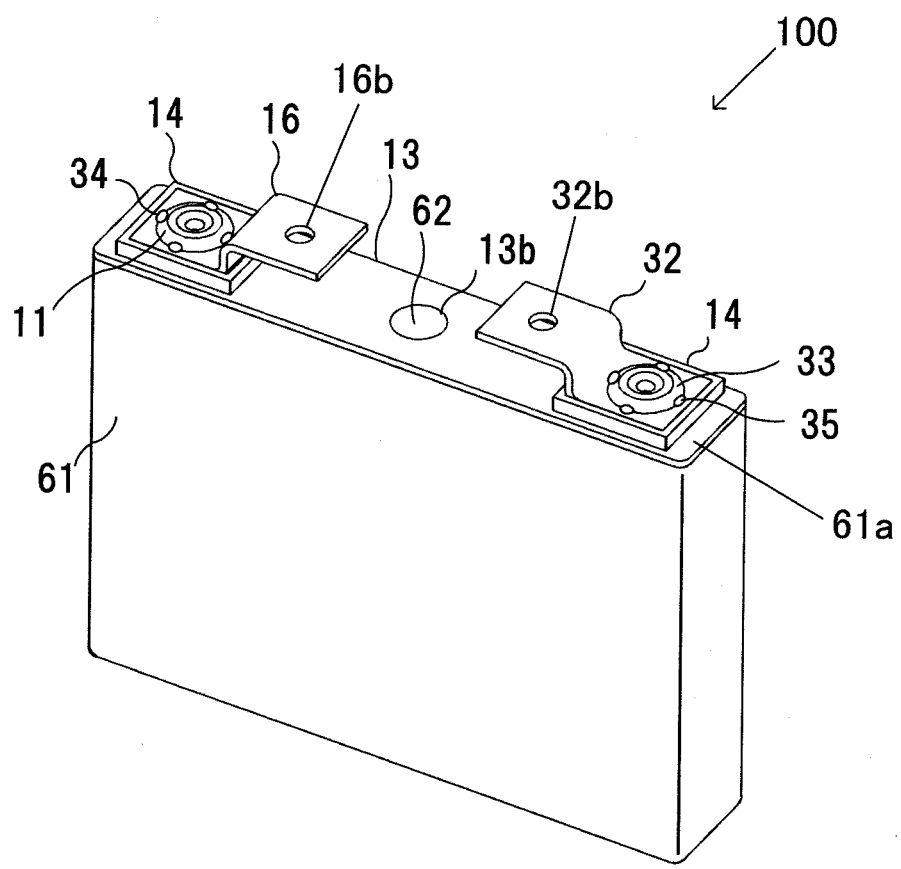
FIG. 1 is a perspective of the secondary battery achieved in an embodiment of the present invention.
Figure 2:
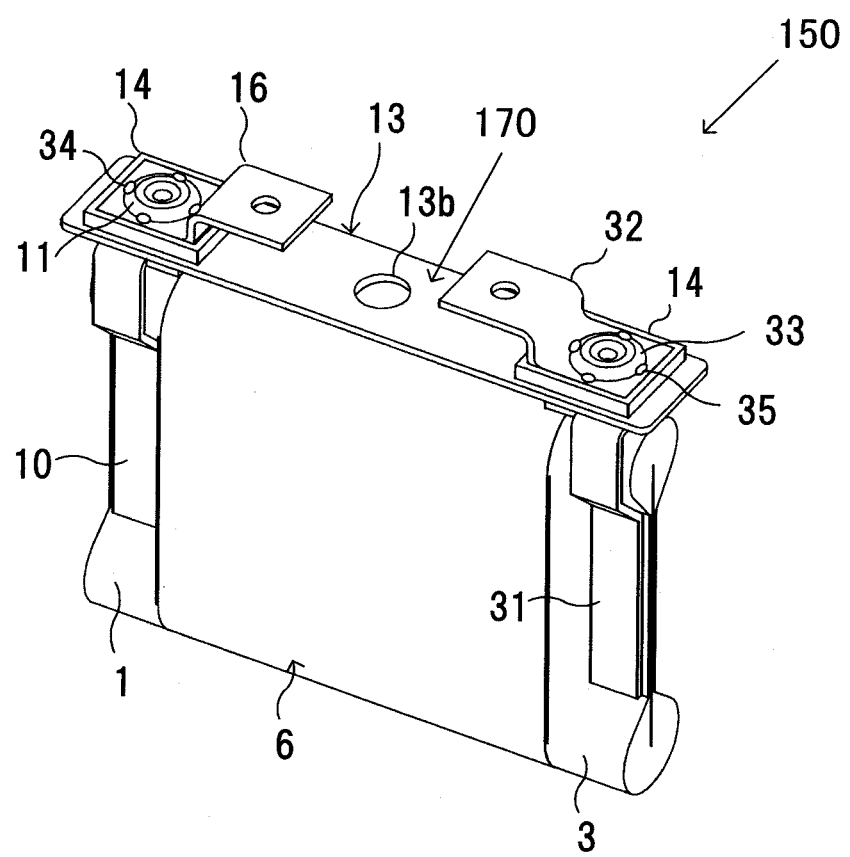
FIG. 2 is a perspective showing the state of connection achieved by the jelly roll and the current collector plates in the secondary battery shown in FIG. 1.

As shown in FIG. 1, a secondary battery 100 is manufactured by first inserting a lid assembly 150 shown in FIG. 2 into a case 61 and then sealing the case 61. FIG. 2 shows the lid assembly 150 assembled by mounting a jelly roll (winding pack) 6 shown in FIG. 4 at a lid-terminal assembly 170 shown in FIG. 3.

Figure 3:
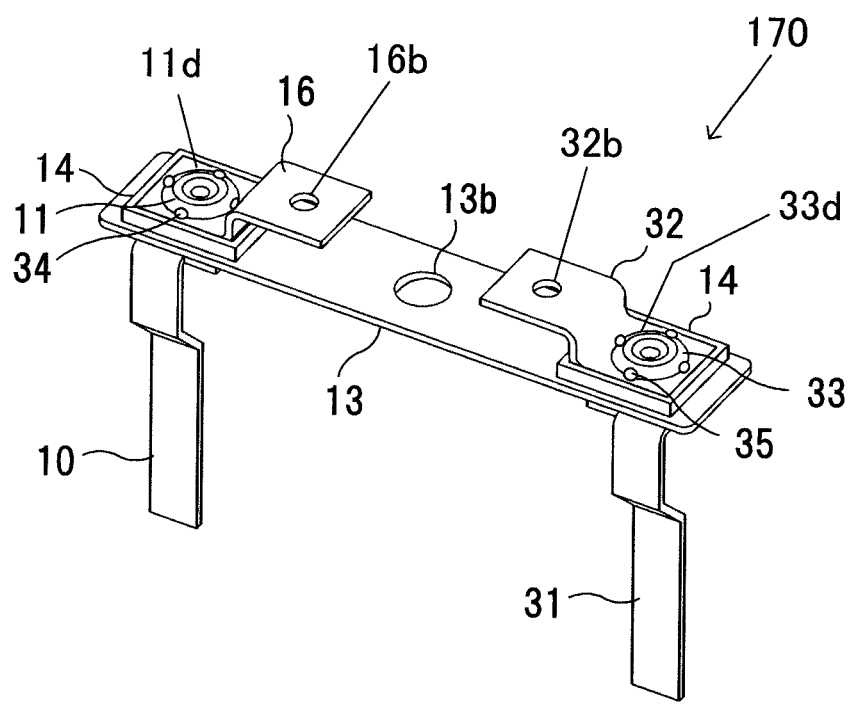
FIG. 3 is a perspective of the lid assembly members in the secondary battery in FIG. 1.

As shown in FIG. 3, the lid-terminal assembly 170 includes a lid 13 with positive and negative electrode external terminals 16 and 32 and positive and negative electrode current collector plates 10 and 31 mounted thereat. As the lid 13 is welded to the case 61 along the peripheral edges thereof, the case 61 becomes sealed. An electrolyte injection opening 13b is formed at the lid 13 and after the case 61 is sealed, an electrolyte (not shown) is poured into the case 61 through the electrolyte injection opening 13b. Once the case 61 is filled with the electrolyte, the electrolyte injection opening 13b is sealed by welding an electrolyte plug 62 thereto.

The positive electrode external terminal 16 and the negative electrode external terminal 32 respectively include through holes 16b and 32b formed therein, and the positive electrode external terminal 16 and the negative electrode external terminal 32 are connected to a bus bar (not shown) via bolts (not shown) inserted through the through holes 16b and 32b.

(Jelly Roll)

Figure 4:
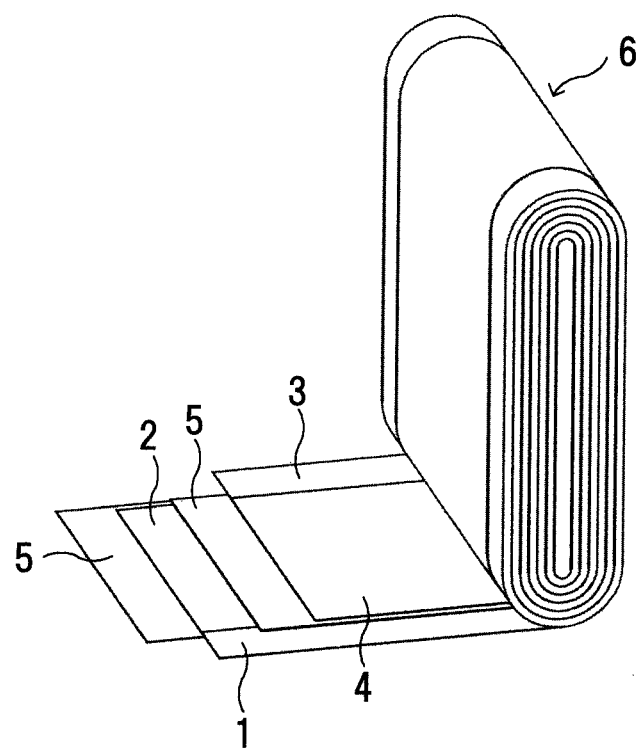
FIG. 4 is a perspective showing the jelly roll in the secondary battery in FIG. 1.

As shown in FIG. 4, the jelly roll 6 is formed by winding a positive foil 1 and a negative foil 3 with a separator 5 inserted between them in a flat configuration. The positive foil 1 is an aluminum foil with a 30 μm thickness, whereas the negative foil 3 is a copper foil with a 15 μm thickness. The separator 5 is constituted of a porous polyethylene resin. The two surfaces of the positive foil 1 are coated with a positive active material 2, whereas the two surfaces of the negative foil 3 are coated with a negative active material 4. Electricity is charged and discharged between the positive active material 2 and the negative active material 4 at the jelly roll 6. Metal foil exposed areas where neither the active material 2 or 4 is applied are formed at the two ends of the winding assembly, one area located at an end of the positive foil 1 and extending along the length of the positive foil and the other area located at an end of the negative foil 3 and facing opposite the one area. The positive electrode current collector plate 10 and the negative electrode current collector plate 31 are welded to these exposed areas, which are flattened.

(Lid Assembly 150)

As shown in FIG. 2, the lid assembly 150 is constituted with the lid-terminal assembly 170 and the jelly roll 6. The lid-terminal assembly 170 includes the positive and negative electrode current collector plates 10 and 31, which are welded respectively to the positive foil 1 and the negative foil 3 exposed at the two ends of the jelly roll 6. The positive and negative electrode current collector plates 10 and 31 are thus electrically and mechanically connected to the winding pack 60.

(Lid-Terminal Assembly 170)

As shown in FIG. 3, the lid-terminal assembly 170 includes the lid 13, the positive and negative electrode current collector plates 10 and 31, positive and negative connector terminals 11 and 33, gaskets 12, insulating members 14 and the positive and negative electrode external terminals 16 and 32, which are all integrated through the manufacturing steps to be described in detail later. The positive electrode current collector plate 10 and the negative electrode current collector plate 31 are metal plates bent along the contours of the side surfaces of the jelly roll 6 located at the two ends that face opposite each other along the axial direction and are respectively constituted of the materials constituting the positive foil 1 and the negative foil 3, i.e., aluminum and copper.

In reference to FIGS. 5 through 11, the lid-terminal assembly 170 is described in detail. It is to be noted that identical shapes and structures are assumed on the positive electrode side and on the negative electrode side and FIGS. 5 through 11 shows the structure on the positive electrode side.

(Swaging at the Lid-Terminal Assembly 170)

Figure 5:
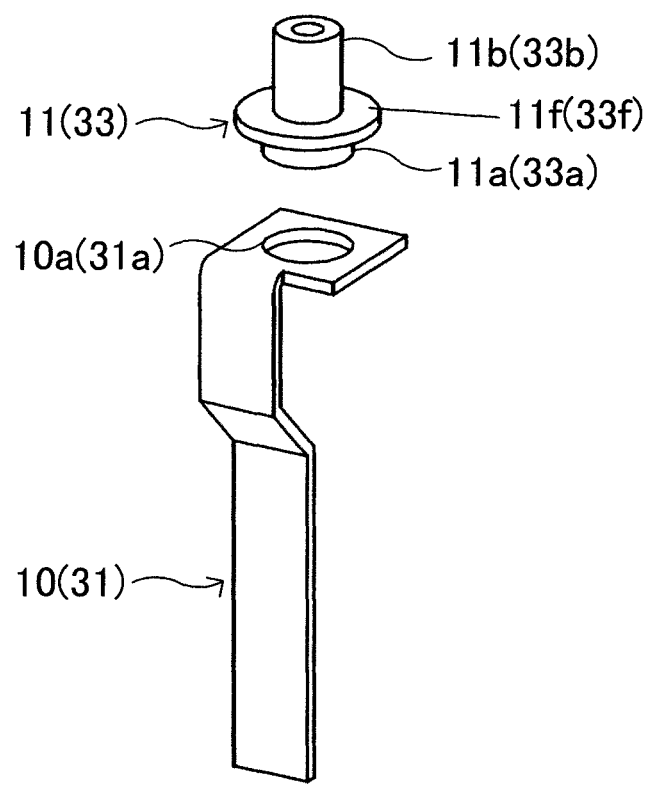
FIG. 5 is an exploded perspective of the positive electrode current collector plate and the positive electrode connector terminal in the secondary battery in FIG. 1.
Figure 6:
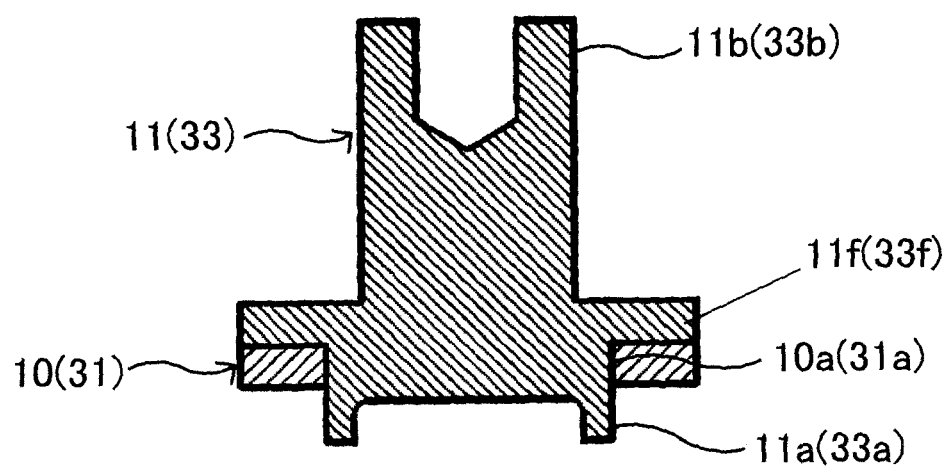
FIG. 6 shows, in a longitudinal sectional view, the positive electrode current collector plate and the positive electrode connector terminal in FIG. 5 assembled together.
Figure 7:
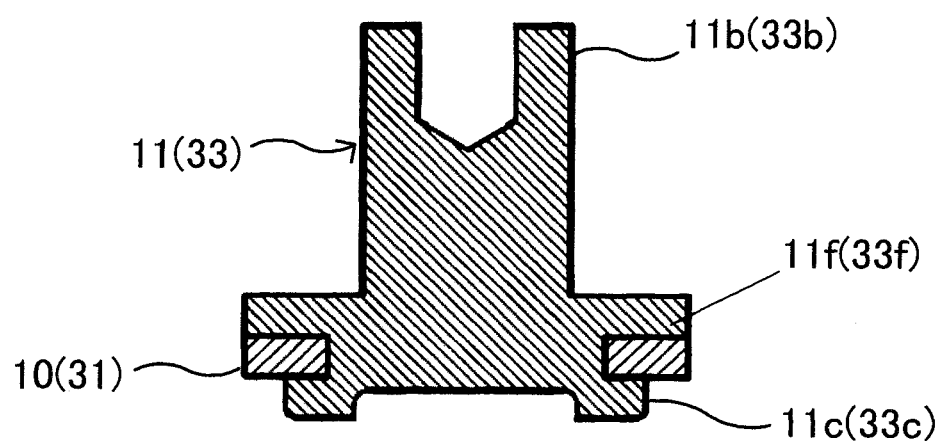
FIG. 7 shows, in a longitudinal sectional view, the positive electrode connector terminal in FIG. 6 in a swaged state.

The positive and negative electrode current collector plates 10 and 31 and the positive and negative electrode connector terminals 11 and 33 in FIG. 5 are locked through swaging in advance, as illustrated in FIGS. 6 and 7. Namely, through holes 10a and 31a are formed at the positive electrode current collector plate 10 and the negative electrode current collector plate 31, whereas tubular portions 11a and 11b (33a and 33b) are present at the two ends of the positive electrode connector terminal 11 and at the two ends of the negative electrode connector terminal 33.

As illustrated in FIGS. 5 through 10, the positive and negative electrode current collector plates 10 and 31 and the positive and negative connector terminals 11 and 33 are locked through swaging by first inserting the tubular portions 11a and 33a at the positive and negative electrode connector terminals 11 and 33 respectively through the through holes 10a and 31a at the positive and negative electrode current collector plates 10 and 31. The tubular portions 11a and 33a are then locked by swaging them toward the outer circumference, thereby forming swaging portions 11c and 33c respectively. As a result, the positive and negative electrode current collector plates 10 and 31 become swage-locked to the positive and negative electrode connector terminals 11 and 33 respectively.

Figure 8:
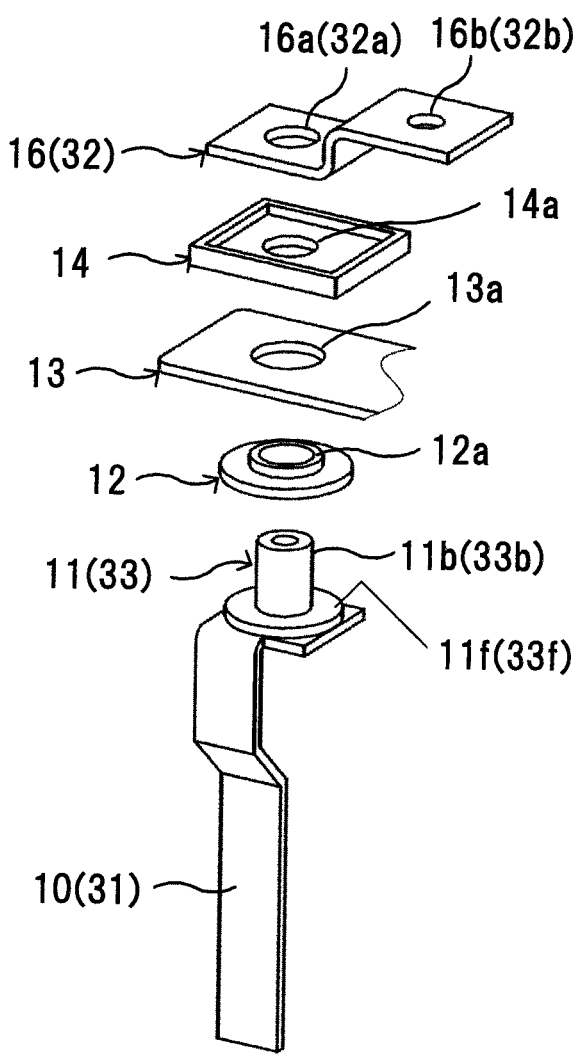
FIG. 8 is an exploded perspective of a gasket swaging portion in the secondary battery in FIG. 1.

As shown in FIG. 8, a through hole 13a through which the positive and negative electrode connector terminals 11 and 33 are inserted, are formed at the lid 13. The positive and negative electrode connector terminals 11 and 33 respectively include shaft portions 11b and 33b inserted through the through holes 13a to project out of the lid 13 and head portions 11f and 33f assuming a larger diameter than the shaft portions.

Figure 9:
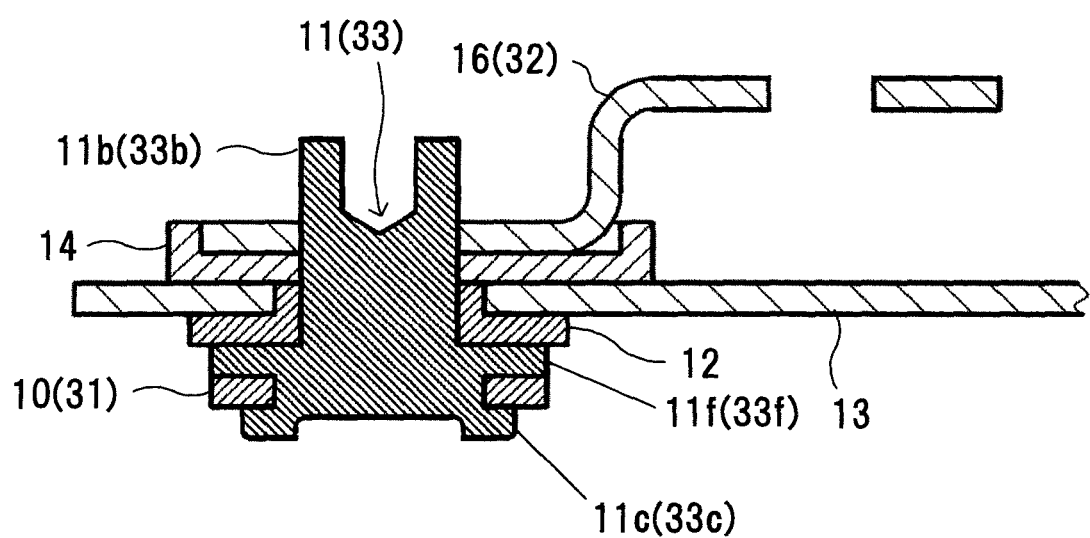
FIG. 9 shows, in a longitudinal sectional view, the positive electrode connector terminal in FIG. 7 with the positive electrode external terminal mounted thereat.

As shown in FIG. 9, the positive and negative electrode connector terminals 11 and 33 are inserted through the through holes 13a with gaskets 12 fitted around the shaft portions 11b and 33b. In addition, the positive and negative electrode external terminals 16 and 32 are fitted, via the insulating members 14, around the shaft portions 11b and 33b of the positive and negative electrode connector terminals 11 and 33 on the outside of the lid 13. The shaft portions 11b and 33b subsequently undergo a swaging step and a welding step.

Figure 10:
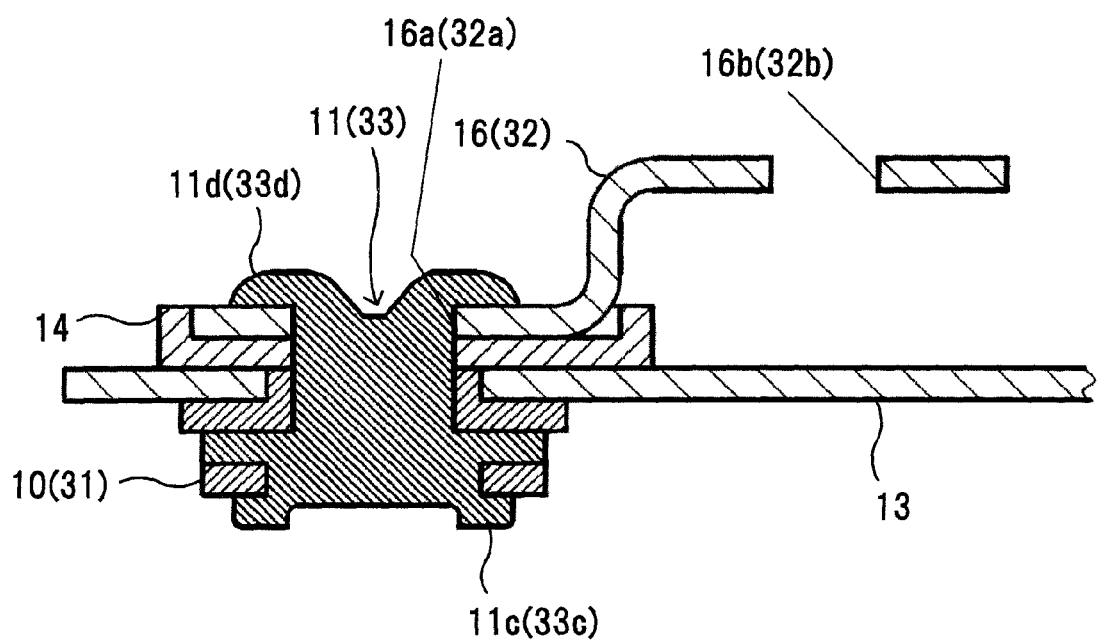
FIG. 10 shows, in a longitudinal sectional view, the positive electrode connector terminal in FIG. 9 in a swaged state.

FIG. 10 is a sectional view of the positive and negative electrode connector terminals 11 and 33, i.e., the positive and negative electrode current collector plates 10 and 31, locked onto the lid 13 together with the positive and negative external terminals 16 and 32 through the swaging step. As shown in FIG. 10, the swaging portions 11c and 33c and the swaging portions 11d and 33d are formed at the positive and negative electrode connector terminals 11 and 33 respectively on the inside and on the outside of the lid 13, and the positive and negative electrode current collector plates 10 and 31, the insulating members 14 and the positive and negative electrode external terminals 16 and 32 are securely fixed to the lid 13 by swage-locking the positive and negative electrode connector terminals 11 and 33.

After inserting the shaft portions 11b and 33b through the various members, as described earlier, the head portions 11f and 33f are pressed into contact with the gaskets 12 through the swaging step to be described in detail later, thereby sealing the gaps between the lid 13 and the positive and negative electrode connector terminals 11 and 33. Through this process, the shaft portions 11b and 33b at the positive and negative electrode connector terminals 11 and 33 become electrically connected with the positive and negative electrode external terminals 16 and 32 respectively while remaining electrically insulated from the lid 13.

In the following description, the swaging portions 11c and 33c formed to lock the current collector plates 10 and 31 will be referred to as first swaging portions and the swaging portions 11d and 33d formed to lock the external terminals 16 and 32 will be referred to as second swaging portions.

The first swaging portions 11c and 33c and the second swaging portions 11d and 33d in the secondary battery 100 according to the present invention are not only mechanically locked but also fixed through welding. Through the swage-lock, the various members are mechanically locked while assuring a high level of strength. Through the welding fusion, the positive and negative electrode connector terminals and the positive and negative electrode external terminals are electrically connected so as to reduce the connection resistance.

According to the present invention, the first and second swaging portions are welded in an oxygen-containing atmosphere so as to encourage formation of an oxide layer at the surfaces of the welded areas and the welded areas are formed in a projecting shape by minimizing the extent to which the molten metals, i.e., the wet weld pools, spread.

(Welding the First and Second Swaging Portions)

Figure 11:
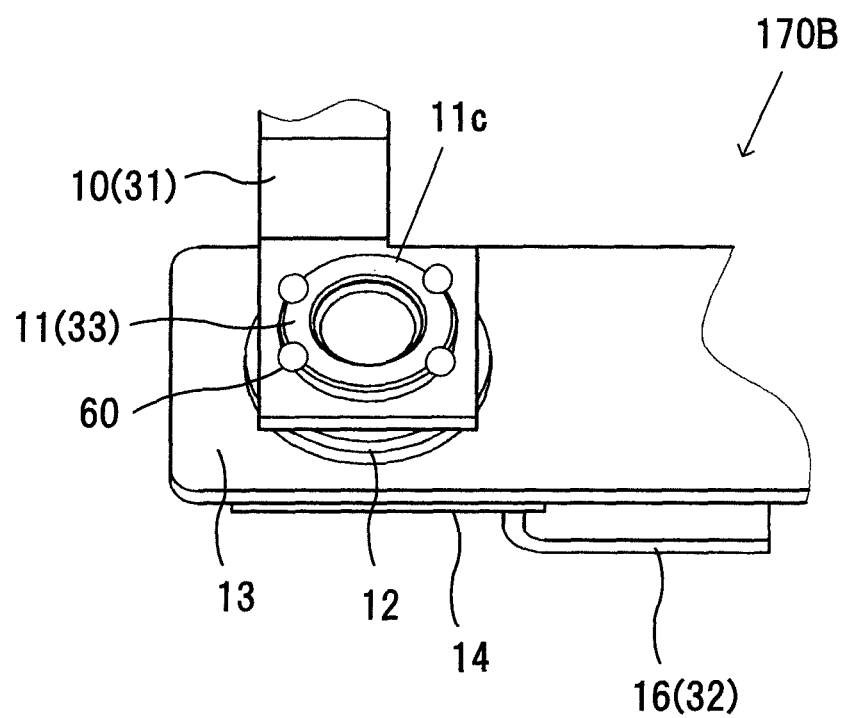
FIG. 11 is a perspective of the positive electrode current collector plate and the positive electrode connector terminal having undergone the welding process, taken from the inside of the lid.

In reference to FIG. 11, the welding positions are set at the first swaging portions 11c and 33c are explained. FIG. 11 is a perspective of the first swaging portion 11c at which the positive electrode current collector plate 10 is locked through swaging, taken from the rear surface side of the lid 13. It is to be noted, however, that FIG. 11 includes the reference numerals assigned to members included on the negative electrode side, which are referred to in the subsequent description. Likewise, FIGS. 13 through 16 also include the reference numerals assigned to the members included in the negative electrode side structure.

As shown in FIG. 11, a plurality of welding spots 60 are formed through spot laser welding, which is a welding process executed by using laser light, at the circumferential edges of the first swaging portions 11c and 33c. In the following description, the welding spots 60 formed at the first swaging portions 11c and 33c will be referred to as first welding spots.

In addition, as shown in FIGS. 1 through 3, a plurality of welding spots 34 and a plurality of welding spots 35 are respectively formed at the circumferential edges of the second swaging portion 11d and the second swaging portion 33d through spot laser welding. In the following description, the welding spots 34 and 35 formed at the second swaging portions 11d and 33d will be referred to as second welding spots.

Through the swaging fusion achieved by combining the swage-lock and the welding fusion as described above, the positive and negative electrode current collector plates 10 and 31, the positive and negative electrode connector terminals 11 and 33 and the positive and negative electrode external terminals 16 and 32 are securely connected both electrically and mechanically, and thus, better reliability is assured.

(Overview of Welding at the First Welding Spots 60 and the Second Welding Spots 34 and 35)

Figure 12:
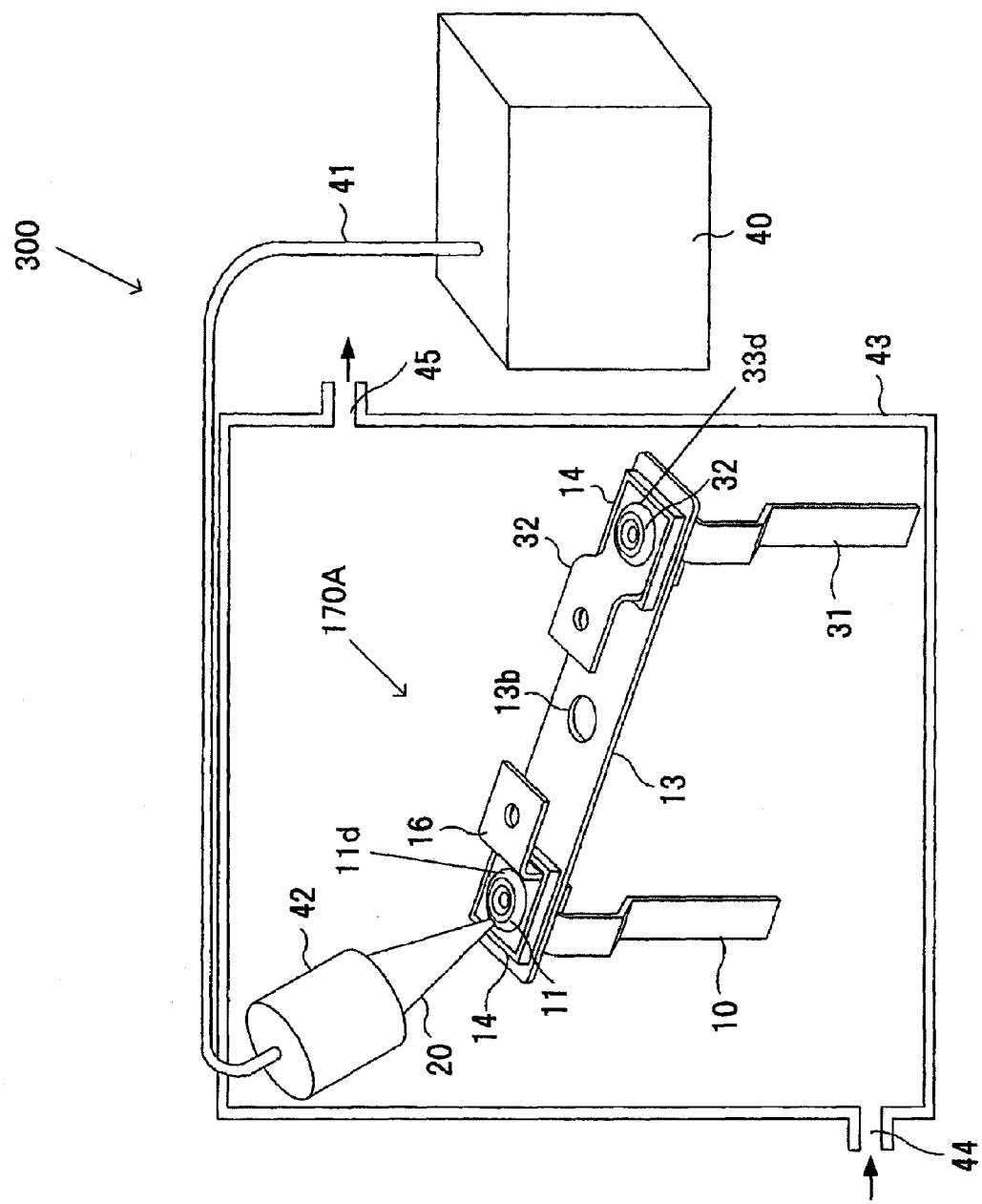
FIG. 12 is a perspective of a welding device.

In reference to FIG. 12, a welding device 300 that may be used to weld the second welding spots 34 and 35 is briefly described. The welding device 300 includes a laser oscillator 40, an optical fiber 41, a machining head 42 and a chamber 43.

The machining head 42, which radiates laser light 20 onto the welding spots 34 and 35 is installed in the chamber 43 and the oscillator 40 is connected, via the optical fiber 41, to the machining head 42. The oscillator 40 generates YAG laser light through oscillation and directs the laser beam thus generated into the optical fiber 41. The laser light having been input to the optical fiber 41 is transmitted through the optical fiber 41 to the machining head 42 which outputs laser spotlight 20 by condensing the laser light at a condenser lens (not shown in the figure). The atmosphere within the chamber 43 can be adjusted via an inflow port 44 and an outflow port 45 disposed thereat.

—Welding at the Second Swaging Portions 34 and 35—

As shown in FIG. 12, a lid-terminal assembly 170A in a manufacturing-in-progress state, with the positive and negative electrode connector terminals 11 and 33 and the positive and negative electrode external terminals 16 and 32 swage-locked to the lid 13, is placed within the chamber 43. The air inside the chamber 43 is replaced with oxygen by supplying oxygen through the inflow port 44 while releasing the air through the outflow port 45 and the oxygen concentration within the chamber 43 is adjusted to a predetermined value. The second welding spots 34 and 35 are welded within the atmosphere achieving the predetermined level of oxygen concentration thus achieved.

Figure 13:
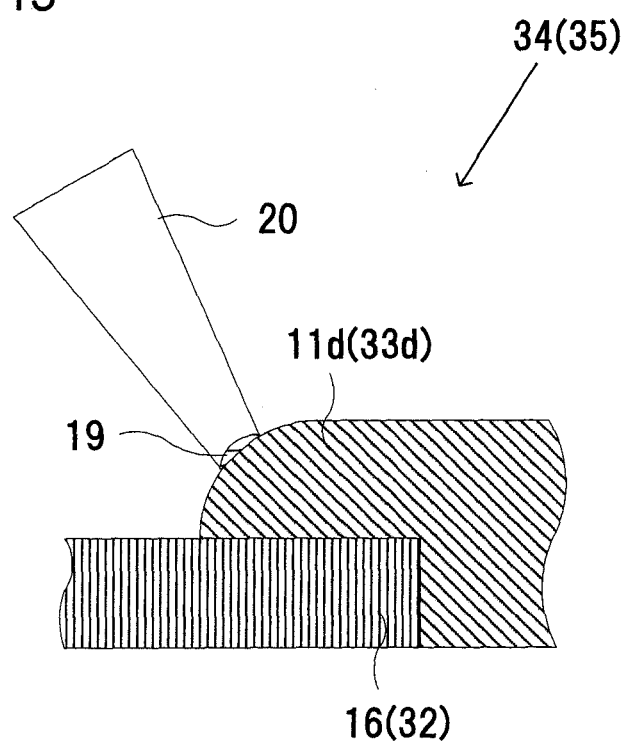
FIG. 13 shows, in a longitudinal sectional view, an initial stage of the welding process in which the positive electrode connector terminal in FIG. 10 is welded onto the positive electrode external terminal.
Figure 15:
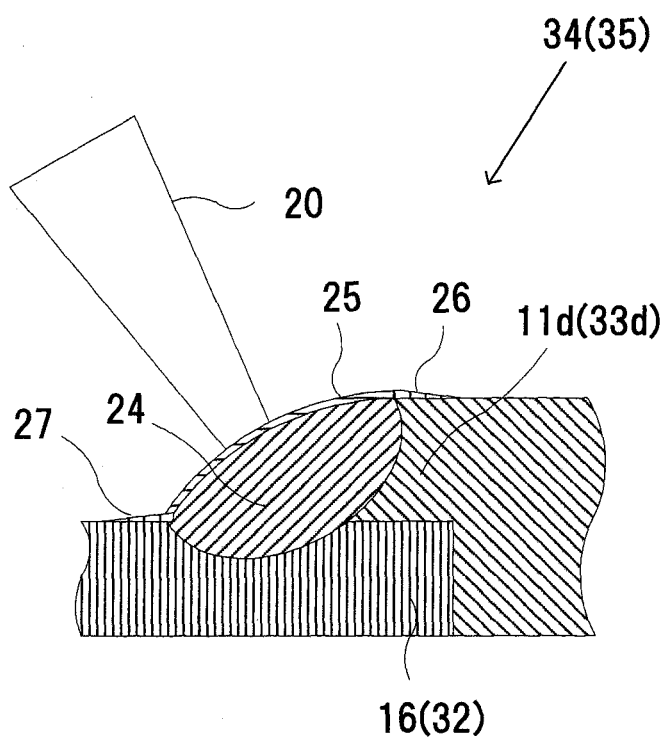
FIG. 15 shows, in a longitudinal sectional view, a finishing stage of the welding process in which the positive electrode connector terminal in FIG. 10 is welded onto the positive electrode external terminal.

The swaging portions 11d and 33d, at which the positive and negative electrode connector terminals 11 and 33 are locked through swaging to the positive and negative electrode external terminals 16 and 32 in the secondary battery in the embodiment, are laser welded within the oxygen-containing atmosphere by radiating the laser spot light 20 onto the second swaging portions 34 and 35 in the chamber 43, as shown in FIG. 13. As a result, oxide layers 25 through 27 are formed at each of the welding spots 34 and 35 in the secondary battery in the embodiment, as shown in FIG. 15. These oxide layers 25 through 27 limit the wet spread of a wet molten pool 24 (minimize the wettability). In addition, since the molten pool becomes solidified while sustaining a projecting shape, the welding spot 34 or 35 does not crack.

—Welding at the First Swaging Portions 60—

Figure 16:
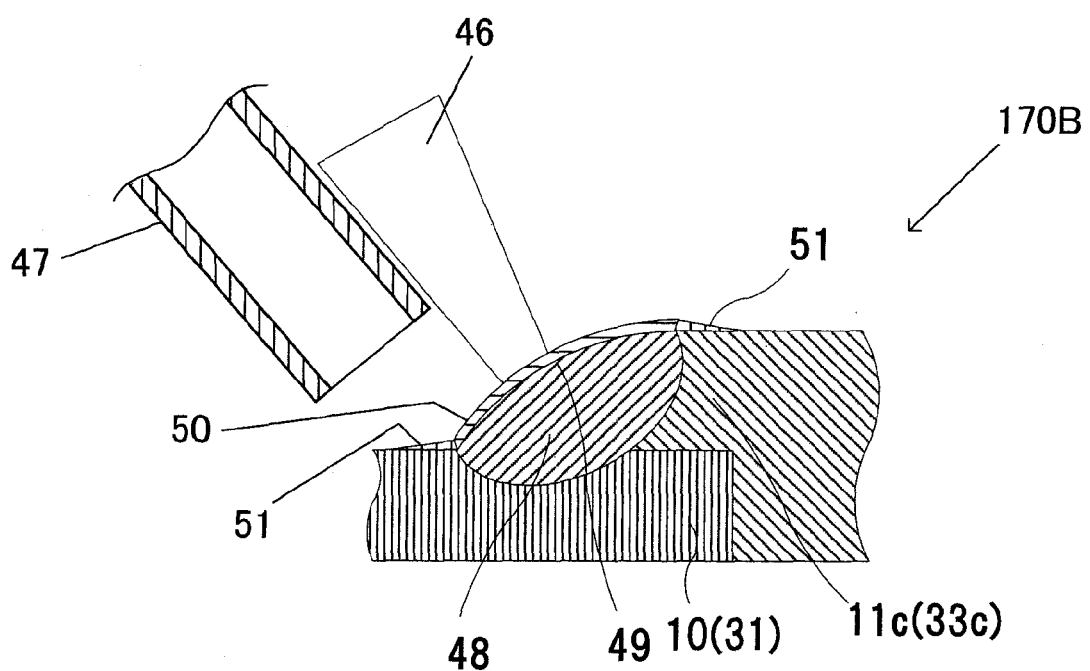
FIG. 16 shows, in a longitudinal sectional view, how the positive electrode current collector plate and the positive electrode connector terminal in FIG. 11 become welded together.

The swaging portions 11c and 31c, at which the positive and negative electrode collector plates 10 and 31 and the positive and negative electrode connector terminals 11 and 32 are swaged together in the secondary battery achieved in the embodiment, are laser welded in an oxygen-containing atmosphere. Namely, as shown in FIG. 16, the swaging portions 11c and 33c are each laser spot welded by supplying oxygen through a nozzle 47 toward each welding spot 60. As a result, the welding spot 60 becomes oxidized and an oxide layer 50 and an oxide layer 51 are formed over the area. These oxide layers 50 and 51 limit the wet spread of a wet molten pool 48. In addition, since the molten pool becomes solidified while sustaining a projecting shape, the welding spot 60 does not crack.

(Details of Welding at the First Welding Spots 60 and the Second Welding Spots 34 and 35)

Figure 14:
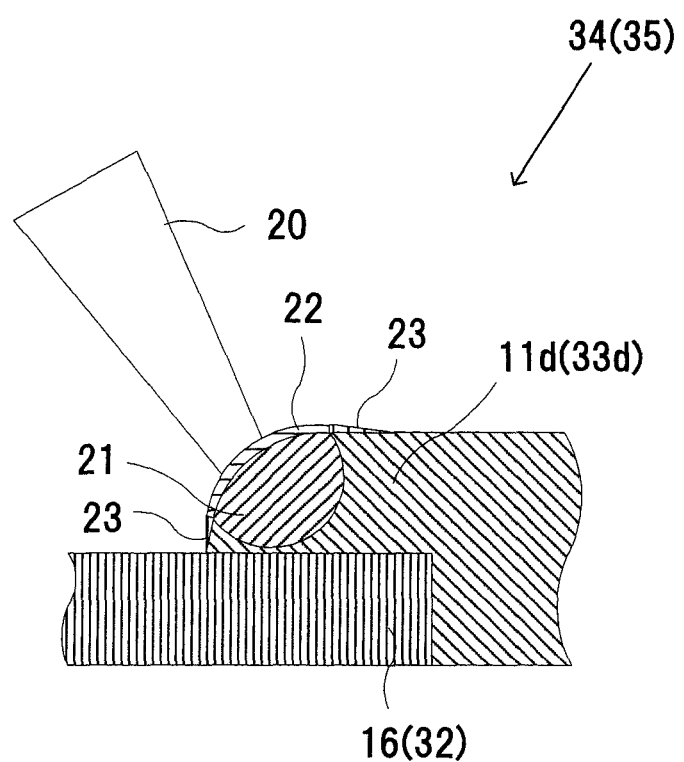
FIG. 14 shows, in a longitudinal sectional view, an intermediate stage of the welding process in which the positive electrode connector terminal in FIG. 10 is welded onto the positive electrode external terminal.

As shown in FIGS. 14 and 15, when welding the outside of the lid 13, molten pools 21 and 24 are formed at each of the second welding spots 34 and 35 ranging over the second swaging portions 11d and 33d and the surfaces of the external terminals 16 and 32 adjacent to the second swaging portions 11d and 33d (only the positive electrode external terminal 16 is shown in the figures). The oxygen-containing atmosphere induces formation of oxide layers 22 and 25 at the surfaces of the molten pools 21 and 24, formation of oxide layers 23 and 26 near the molten pools 21 and 24 at each of the second swaging portions 11d and 33d, and formation of an oxide layer 27 at the surface of the external terminal 16 or 32 adjacent to the second swaging portion 11d or 33d.

As shown in FIG. 16, when welding the inside of the lid 13, the molten pool 48 is formed at each of the first welding spots 60 ranging over the first swaging portion 11c or 33c and the surface of the current collector plate 10 or 31 adjacent to the first swaging portions 11d and 33d (only the positive electrode current collector plate 10 is shown in the figure). The oxygen-containing atmosphere induces formation of oxide layers 49 and 50 at the surface of the molten pool 48, formation of an oxide layer 51 near the molten pool 48 at each of the first swaging portions 11c and 33c, and formation of an oxide layer 51 at the surface of the current collector plate 10 or 31 adjacent to the first swaging portion 11c or 33c.

The wet molten metal can spread only if the heat of the molten pools 21, 24 and 48 breaks the oxide layers 23, 26, 27 and 51 formed adjacent to the molten pools. However, a high level of energy is required to break the oxide layers, i.e., the oxide layers cannot be readily destroyed. As a result, the molten pools 21, 24 and 48 are not allowed to spread readily.

The circumferential edges of the second swaging portions 11d and 33d are staged relative to the positive and negative electrode external terminals 16 and 32, whereas the circumferential edges of the first swaging portions 11c and 33c are staged relative to the surfaces of the positive and negative electrode current collector plates 10 and 31. For this reason, the molten pools 21, 24 and 48 formed at the swaging portions 11c, 11d, 33c and 33d tend to flow downward toward the positive and negative electrode external terminals 16 and 32 and the positive and negative electrode current collector plates 10 and 31 taking up lower positions. However, a high level of supporting force provided by the oxide layers 22, 23, 25 through 27 and 49 through 51 deters the downward flow.

Consequently, the wettability of the molten pools and the surfaces of the neighboring welding spots is lowered, the extent to which the wet molten pools are allowed to spread is reduced, the surface areas of the molten pools 21, 24 and 48 are minimized and the molten pools 21, 24 and 48 are ultimately solidified while sustaining a projecting shape at their surfaces. Since low tensile residual stress is assured at the centers of the surfaces of the molten pools 21, 24 and 48 having solidified while sustaining the projecting shape, cracking is effectively prevented.

Namely, the secondary battery in the embodiment is manufactured by oxidizing the surfaces of the members present around molten weld pools when welding the positive and negative electrode current collector plates 10 and 31 with the positive and negative electrode connector terminals 11 and 33 and welding the positive and negative electrode external terminals 16 and 32 with the positive and negative electrode connector terminals 11 and 33, so as to minimize the extent to which the wet weld surfaces are allowed to spread and thus prevent cracking at the welded areas.

(Secondary Battery Manufacturing Method)

Figure 17:
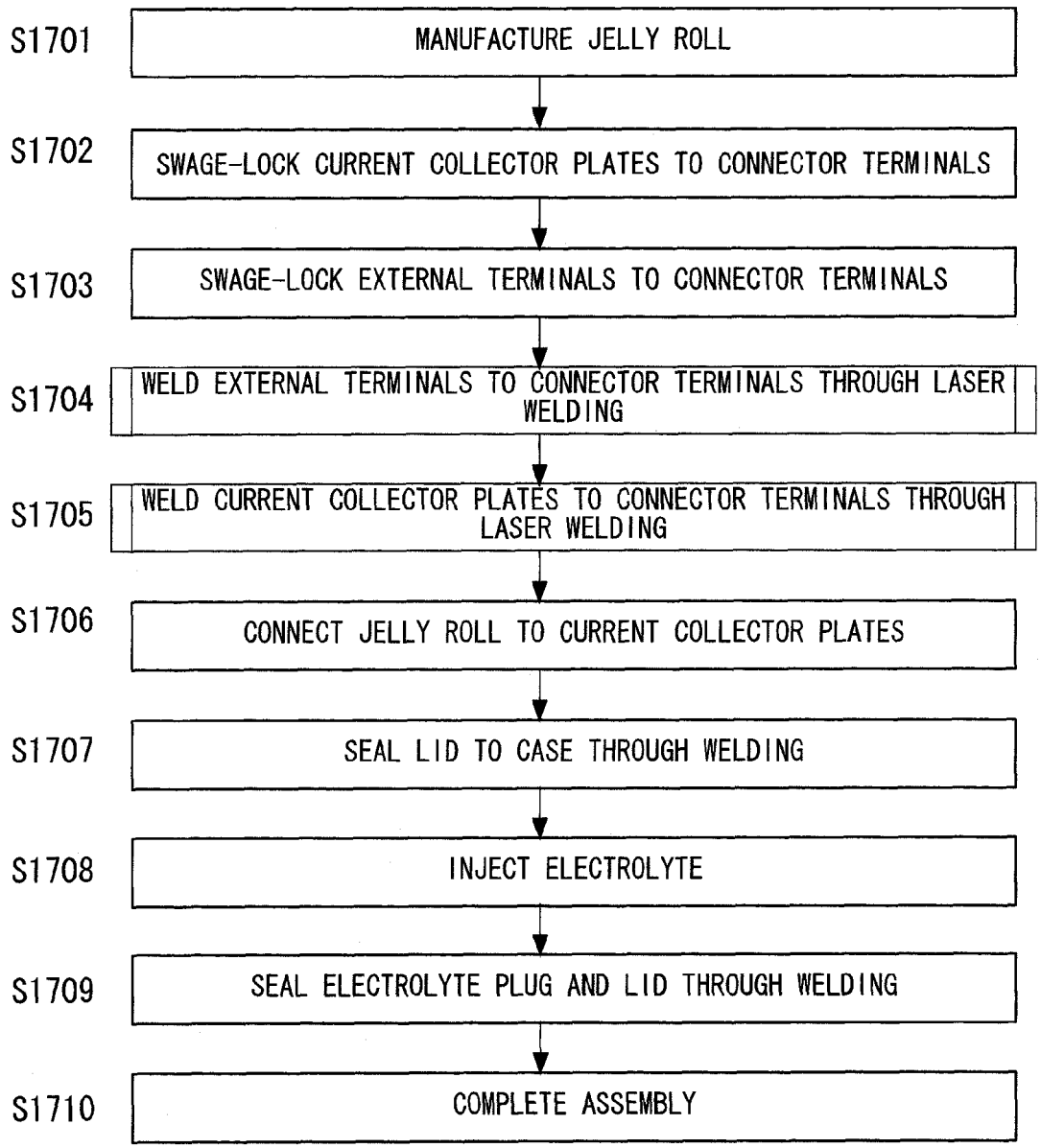
FIG. 17 presents a flowchart of an embodiment of the secondary battery manufacturing method according to the present invention.

FIG. 17 shows the manufacturing procedure through which the secondary battery described above is manufactured.

step S1701: The jelly roll 6 (see FIG. 4) is manufactured by winding the positive electrode and the negative electrode in a flat configuration.

step S1702: The positive electrode current collector plate 10 and the negative electrode current collector plate 31 are respectively locked with the positive electrode connector terminal 11 and the negative electrode connector terminal 33 through swaging.

step S1703: The positive electrode external terminal 16 and the negative electrode external terminal 32 are respectively locked with the positive electrode connector terminal 11 and the negative electrode connector terminal 33 through swaging.

step S1704: The positive electrode external terminal 16 and the negative electrode external terminal 32 are respectively welded to the positive electrode connector terminal 11 and the negative electrode connector terminal 33 through laser welding. This step will be described in detail later.

step S1705: The positive electrode current collector plate 10 and the negative electrode current collector plate 31 are respectively welded to the positive electrode connector terminal 11 and the negative electrode connector terminal 33 through laser welding. This step will be described in detail later.

step S1706: The jelly roll 6 is connected with the positive and negative electrode current collector plates 10 and 31.

step S1707: The lid 13 is welded onto the case 61 and thus the case 61 is sealed.

step S1708: The case 61 is filled with electrolyte, poured through the electrolyte injection opening 13b.

step S1709: The electrolyte injection opening 13b is tightly sealed with the electrolyte plug 62.

step S1710: The secondary battery assembly process is completed through steps S1701 to S1709 described above.

(Welding Procedure Through which the Second Welding Spots 34 and 35 are Welded)

Figure 18:
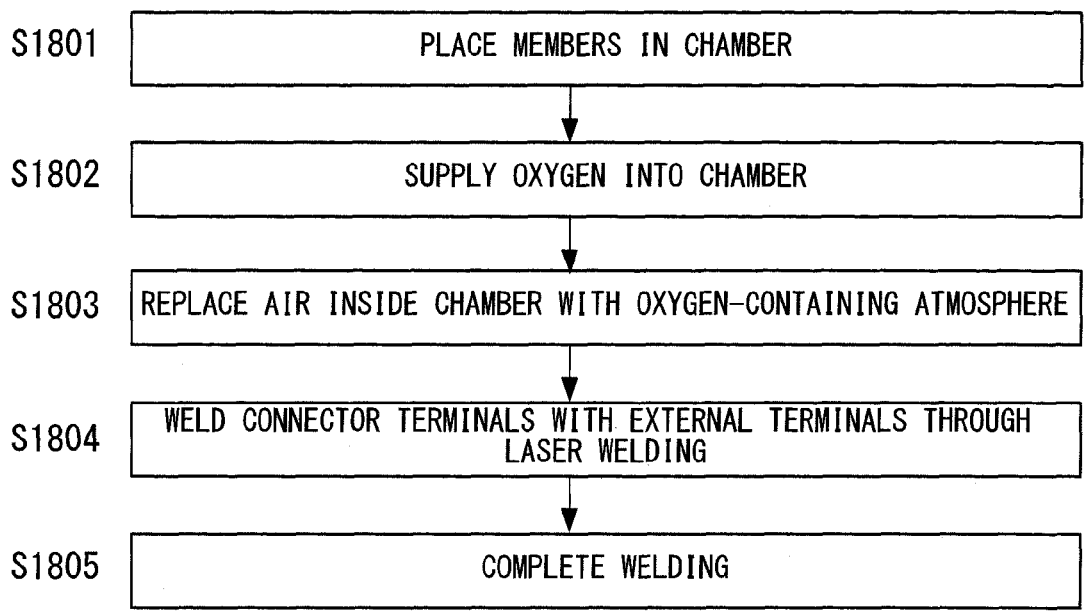
FIG. 18 presents a flowchart of the external terminal-connector terminal welding step in FIG. 17.

The welding process (step S1704), executed as part of the manufacturing procedure shown in FIG. 17 to weld the positive and negative electrode external terminals 16 and 32 to the positive and negative electrode connector terminals 11 and 33, includes the following steps, as shown in FIG. 18.

step S1801: A work-in-progress assembly 170A, which is to become the lid-terminal assembly 170, with the positive and negative electrode current collector plates 10 and 31 fully locked through swaging with the positive and negative electrode connector terminals 11 and 33 respectively and the positive and negative electrode external terminals 16 and 32 fully locked through swaging with the positive and negative electrode connector terminals 11 and 33 respectively, is placed inside the chamber 43 (see FIG. 12).

It is to be noted that when the work-in-progress assembly 170A is placed in the chamber 43, the inflow port 44 and the outflow port 45 are both open to the atmosphere, and thus, the chamber 43 is filled with air.

step S1802: A gas with an oxygen concentration regulated to a predetermined level is delivered into the chamber 43 through the inflow port 44, while the outflow port 45 remains open to the atmosphere.

step S1803: The gas is continuously delivered into the chamber 43 through the inflow port 44 over a predetermined length of time while the outflow port 45 remains open to the atmosphere. As a result, the atmosphere within the chamber 43 is replaced with the gas containing oxygen at the predetermined concentration.

step S1804: The positive electrode connector terminal 11 and the negative electrode connector terminal 33 are respectively welded to the positive electrode external terminal 16 and the negative electrode external terminal 32, through spot welding at, for instance, four spots set for each weld site, by using the laser light 20. The pulse energy of the laser light 20 used in the welding process should be set to, for instance, 30 J.

The welding process is executed by radiating the laser light 20 condensed into, for instance, a 0.4 mm-diameter circular beam toward the area around the swaging portions 11d or 33d so as to condense the laser beam onto the surface of each welding spot 34 or 35. The radiating angle should be, for instance, 60° relative to the positive electrode external terminal 16 or the negative electrode external terminal 32.

While the temperatures at the swaging portions 11d and 33d and the positive and negative electrode external terminals 16 and 32 rise during the initial stage of the welding process, the temperatures do not become high enough to melt the swaging portions or the positive and negative electrode external terminals. The surfaces of the swaging portions 11d and 33d, where the temperatures have risen, react with oxygen present in the surrounding atmosphere, resulting in the formation of an oxide layer 19 at each surface. While a very thin natural oxide layer is present at the surface of the welding spot prior to the welding process, a thicker oxide layer is develops through the exposure to the high-temperature oxygen-containing atmosphere.

FIG. 13 does not include an illustration of the natural oxide layer and simply shows the oxide layer 19 assuming a significant thickness attributable to the oxidation.

FIG. 14 shows the state during the intermediate stage of the welding process in a sectional view. As the laser light 20 is continuously radiated in the state shown in FIG. 13, each of the swaging portions 11d and 33d starts to partially melt after a specific length of time elapses and a molten weld pool 21 is formed as a result. An aluminum (or copper) oxide layer is formed at the surface of the molten pool 21. Since the specific gravity of the oxide layer formed inside the molten pool 21 is smaller than that of the liquid aluminum (liquid copper), the oxide layer comes up to the surface of the molten pool 21 and thus forms a thick oxide layer 22 together with the oxide layer already present at the surface. As a result, the oxide layer 19 in FIG. 13 becomes a thick oxide layer 22 ranging over a large area as the oxidation progresses. In addition, as the temperature at the surface the swaging portion 11d or 33d near the molten pool 21 rises, reaction with the oxygen in the surrounding atmosphere occurs in the area to result in formation of a thick oxide layer 23.

FIG. 15 shows the late stage of the welding process in a sectional view. As the laser light 20 is continuously radiated in the state shown in FIG. 14, the molten pool 24 increases its volume and a large volume molten pool 24 is formed after a specific length of time elapses. An oxide layer 25 with a large thickness, which includes the oxide layers 22 and 23 formed as shown in FIG. 14, is formed at the surface of the molten pool 24.

In addition, an oxide layer 26 is formed at the surface of the welding spot near the molten pool 24 at the swaged portions 11d or 33d and an oxide layer 27 is formed at the surface of the welding spot near the molten pool 24 at the positive electrode external terminal 16 or the negative electrode external terminal 32. The oxide layer 26 and the oxide layer 27 are new oxide layers formed due to the exposure to the oxygen-containing atmosphere at high temperature.

As the welding process progresses, the molten pool 24 expands while destroying the aluminum oxide layer 26 assuming a significant thickness and a high melting point, which is present at the surface of the nearby welding spot. Since a high level of breaking energy is required to destroy the oxide layer 26, the wettability at the molten pool 24 and the nearby welding spot surfaces is lowered. As a result, the extent to which the wet molten pool 24 is allowed to wet spread is minimized and the surface area of the molten pool 24 is not allowed to become very large. Thus, the molten pool 24 becomes solidified while sustaining a projecting surface shape. Since a low tensile residual stress level is assured at the center of the projecting surface of the molding pool 24 in the fully solidified state, cracking can be effectively prevented.

As described above, the oxide layers 25 through 27 assume film thicknesses large enough to minimize the wettability of the molten metals.

The results of welding tests conducted in oxygen/nitrogen mixed gas atmospheres created inside the chamber 43 by setting the oxygen concentration level to 0%, 10%, 20%, 30%, 40%, 50% and 100% confirm that cracking can be effectively prevented when the oxygen concentration is 10% or higher. In addition, a cracking prevention effect was also observed when a welding process was executed in air having a 20% oxygen concentration outside the chamber 43.

It is to be noted that since the surface area of the wet molten pool can be reduced by minimizing the extent of wet spreading of the molten pool, the residual tensile residual stress attributable to the coagulative shrinkage occurring at the time of solidification can be reduced and thus, cracking can be prevented effectively. A particularly significant cracking-prevention effect is achieved on the positive electrode side since the coefficient of coagulative shrinkage of aluminum is high. Furthermore, a higher rate of laser light absorption, with which the laser light 20 is observed, is achieved through the oxidation, thereby achieving a secondary advantage of better weld penetration.

step S1805: The positive and negative electrode connector terminals 11 and 33 become fully welded with the positive and negative electrode external terminals 16 and 32 through steps S1801 to S1804 described above.

(Welding Procedure Through which the First Welding Spots 60 are Welded)

Figure 19:
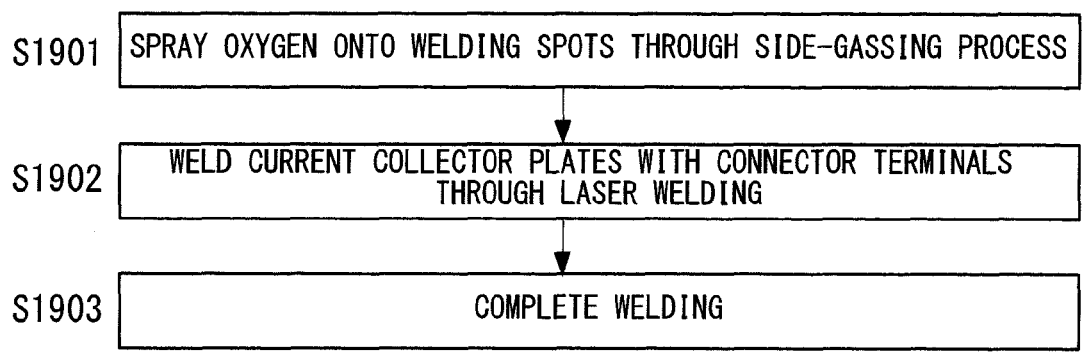
FIG. 19 presents a flowchart of the current collector plate-connector terminal welding step in FIG. 18.

The welding process (step S1705), executed as part of the manufacturing procedure shown in FIG. 17 to weld the positive and negative electrode current collector plates 10 and 31 to the positive and negative electrode connector terminals 11 and 33, includes the following step, as shown in FIG. 19.

step S1901: While the welding process through which the positive and negative electrode connector terminals 11 and 33 are welded to the positive and negative electrode external terminals 16 and 32 is in progress, a work-in-progress assembly 170B, to become the lid-terminal assembly 170, is sprayed with oxygen through a side-gassing process, as shown in FIG. 16. The term "side gassing" process is used to refer to a processing step in which a gas is sprayed toward a welding spot 60 along a direction at a tilt relative to the direction in which the laser light 20 is radiated. A processing step in which a gas is sprayed along a direction coaxial to the laser light 20, in contrast, is referred to as a "center-gassing" process.

FIG. 16 shows, in a sectional view, a state assumed during the welding process executed to weld the positive and negative electrode current collector plates 10 and 32 to the positive and negative electrode connector terminals 11 and 33 respectively. The laser light 20 is radiated at a 60° tilt relative to the surface of the positive electrode current collector plate 10 or the negative electrode current collector plate 32. While the welding process is executed in room air, an oxide layer 50 and an oxide layer 51, formed by oxidizing each welding spot 60 with oxygen sprayed through the nozzle 47 toward the welding spot, deter the spread of the surface area of the wet molten pool 48. As a result, the molten pool 48 solidifies while sustaining a projecting surface shape and since a lower tensile residual stress level is assured at the center of the molten pool surface in the fully solidified molten pool, cracking can be effectively prevented. The requirements imposed with regard to the oxygen-containing atmosphere match the requirements for the oxygen-containing atmosphere within which the positive and negative electrode connector terminals 11 and 33 are welded to the positive and negative external terminals 16 and 32.

step S1902: The positive and negative current collector plates 11 and 33 are welded to the positive and negative electrode connector terminals 16 and 32 at, for instance, four welding spots in each welding site, with the energy level of the laser light and the spot size set to match those assumed for the welding process through which the positive and negative electrode connector terminals 11 and 33 are welded with the positive and negative external terminals 16 and 32. As in the welding process executed to weld the positive and negative electrode connector terminals 11 and 33 to the positive and negative electrode external terminals 16 and 32, the oxide layers initially formed at the swaged portions 11c and 33c increase their thicknesses and eventually, oxide layers 50 with a large thickness are formed as the oxide layers initially formed at the swaged portions become integrated with the oxide layers formed near the molten pools. Through radiation of the laser light 20, an oxide layer 51 is formed over the surface of each welding spot near the molten pool 48 at the swaged portion 11c or 33c and an oxide layer 51 is also formed over the surface of the welding spot near the molten pool 48 in the positive electrode current collector plate 10 or the negative electrode current collector plate 33.

Consequently, the wettability at the molten pool 48 and the nearby welding spot surfaces is lowered. As a result, the extent to which the wet molten pool 48 is allowed to spread is minimized and the molten pool 48 becomes solidified while sustaining a projecting surface shape. Since a low tensile residual stress level is assured at the center of the projecting surface of the molding pool in the fully solidified state, cracking can be effectively prevented. On the negative electrode side, too, the negative electrode current collector plate 31 and the negative electrode connector terminal 33 are welded together at four welding spots.

step S1903: The positive and negative electrode current collector plates 10 and 31 become fully welded with the positive and negative electrode connector terminals 11 and 33 through steps S1901 and S1902 described above.

As described above, the oxide layers 50 and 51 assume film thicknesses large enough to minimize the wettability of the molten metals.

The secondary battery manufacturing method according to the present invention described above includes welding steps in which swaging fusion spots are formed through laser welding executed in an atmosphere containing oxygen with an oxygen concentration of 10% or more.

In addition, the secondary battery manufacturing method achieved in the embodiment comprises a first step in which the jelly roll 6 is manufactured by winding the positive electrode 1 and the negative electrode 3 via the separator 5, a second step in which the positive electrode connector terminal 11 and the negative electrode connector terminal 33 are respectively swaged with the positive electrode current collector plate 10 and the negative electrode current collector plate 31 used to connect the positive electrode 1 and the negative electrode 3 to the positive electrode external terminal 16 and the negative electrode external terminal 32 respectively, a third step in which the positive electrode connector terminal 11 and the negative electrode connector terminal 33 are respectively swaged with the positive electrode external terminal 16 and the negative electrode external terminal 32, a fourth step in which the positive electrode current collector plate 10 and the negative electrode current collector plate 31 are respectively connected to the positive electrode 1 and the negative electrode 3, a fifth step in which swaged portions formed through the second step are welded in an oxygen-containing atmosphere with a specific oxygen concentration, a sixth step in which swaged portions formed through the third step are welded in an oxygen-containing atmosphere with a specific oxygen concentration, a seventh step in which the lid assembly 150 is manufactured by connecting the lid-terminal assembly 170, with the positive and negative electrode current collector plates 10 and 31, the positive and negative electrode connector terminals 11 and 33 and the positive and negative electrode external terminals 16 and 32 thereof having been integrated through the third through sixth steps, to the jelly roll 6, an eighth step in which the lid assembly 150 is housed within the case 61, which includes an opening, a ninth step in which the opening is covered with the lid 13 to seal the case 61, and a tenth step in which the electrolyte is poured into the case 61.

(Variations)

The embodiment described above allows for the following variations.

(1) In the embodiment described above, the positive and negative electrode current collector plates 10 and 31 are welded to the positive and negative electrode connector terminals 11 and 33 through laser welding executed in an atmosphere created by spraying oxygen. As an alternative, the positive and negative electrode current collector plates 10 and 31 and the positive and negative electrode connector terminals 11 and 33 may be welded in an oxygen-containing atmosphere with a specific oxygen concentration created within the chamber 43, as in the welding process executed to weld the positive and negative electrode connector terminals 11 and 33 to the positive and negative electrode external terminals 16 and 32.

(2) The secondary battery in the embodiment described above, which includes the positive and negative electrode current collector plates 10 and 31, the positive and negative electrode connector terminals 11 and 33 and the positive and negative electrode external terminals 16 and 32, is manufactured by swage-locking the positive and negative electrode current collector plates 10 and 31 with the positive and negative electrode connector terminals 11 and 33 and then fusing the positive and negative electrode current collector plates 10 and 31 with the positive and negative electrode connector terminals 11 and 33 respectively (first locking portions) and then by swage-locking the positive and negative electrode connector terminals 11 and 33 to the positive and negative electrode external terminals 16 and 32 and also by fusing the positive and negative electrode current collector plates 10 and 31 to the positive and negative electrode connector terminals 11 and 33 respectively (second locking portions). However, the present invention is not limited to this example and it may be adopted in a secondary battery in which the first locking portions alone are welded or a secondary battery in which the second locking portions alone are welded.

Accordingly, secondary batteries structured as described below are also within the scope of the present invention.

Namely, the secondary battery according to the present invention may comprise a jelly roll 6 that includes a positive electrode 1 and a negative electrode 3 wound via a separator 5, a case 61 housing the winding back 6, a lid 13 that seals the case 61, and electrically conductive input/output members (10μ, 11, 16, 31, 33, 32) via which charge/discharge currents are input and output between the jelly roll 6 and an external load. The electrically conductive input/output members may include, at least, a positive electrode current collector plate 10 with one end thereof connected to the positive electrode 1, a negative electrode current collector plate 31 with one end thereof connected to the negative electrode 3, a positive electrode external conductive member 11 with one end thereof connected to another end of the positive electrode current collector plate 10 and another end thereof extending to the outside of the lid 13 and a negative electrode external conductive member 33 with one end thereof connected to another end of the negative electrode current collector plate 31 and another end thereof extending to the outside of the lid 13. The one end of the positive electrode external conductive member 11 and the one end of the negative electrode external conductive member 33 may be respectively swage-fused to the other ends of the positive electrode current collector plate 10 and the negative electrode current collector plate 31 with oxide layers 50 and 51 formed at the surface of each swage-fused area.

In addition, the secondary battery according to the present invention may comprise a jelly roll 6 that includes a positive electrode 1 and a negative electrode 3 wound via a separator 5, a case 61 housing the winding back 6, a lid 13 that seals the case 61, and electrically conductive input/output members (10, 11, 16, 31, 33, 32) via which charge/discharge currents are input and output between the jelly roll 6 and an external load. The electrically conductive input/output members may include, at least, a positive electrode current collector plate 10 with one end thereof connected to the positive electrode 1, a negative electrode current collector plate 31 with one end thereof connected to the negative electrode 3, a positive electrode connector terminal 11 with one end thereof connected to the positive electrode current collector plate 10, a negative electrode connector terminal 33 with one end thereof connected to the negative electrode current collector plate 31, a positive electrode external terminal 16 disposed on an outer side of the lid 13, which is swage-fused with the positive electrode connector terminal 11 with another end of the positive electrode connector terminal 11 passing through the positive electrode external terminal 16, and a negative electrode external terminal 32 disposed on the outer side of the lid 13, which is swage-fused with the negative electrode connector terminal 33 with another end of the negative electrode connector terminal 33 passing through the negative electrode external terminal 32, oxide layers 25 through 27 may be formed at a the surface of each swage-fused area where the positive or negative electrode connector terminal 11 or 33 is swage-fused with the positive or negative electrode external terminal 16 or 32.

(3) While an explanation is given above on an example in which the present invention is adopted in a secondary battery that includes the positive and negative electrode current collector plates 10 and 31, the positive and negative electrode connector terminals 11 and 33 and the positive and negative electrode external terminals 16 and 32, the present invention is not limited to this example. For instance, the present invention may be adopted in a secondary battery that does not include the positive and negative electrode external terminals 16 and 32. Namely, the present invention may be adopted in a secondary battery that includes the bus bar directly locked to the front end of the positive and negative electrode connector terminals 11 and 33 swage-locked and also fused onto the current collector plates 10 and 31 respectively, i.e., to the front ends passing through the lid 13 and projecting to the outside.

It is to be noted that the shape of the front ends does not need to be a shaft shape and the present invention may be adopted in a secondary battery with the front ends of the connector terminals assuming a flat shape. Furthermore, the present invention is not limited to the examples described in reference to the embodiment pertaining to the shape and structure of the current collector plates and the shape and structure of the jelly roll as well.

It is to be also noted that the welding device engaged in operation to execute the welding process in the oxygen-containing atmosphere is not limited to that described in reference to the embodiment.

The above described embodiment is an example, and various modifications can be made without departing from the scope of the invention.

What is claimed is:
1. A secondary battery comprising:
a jelly roll that includes a positive electrode and a negative electrode wound via a separator;
a case housing the jelly roll;
a lid that seals the case; and
electrically conductive input/output members via which charge/discharge power is input and output between the jelly roll and an external load, wherein:
the electrically conductive input/output members include, at least;
a positive electrode current collector plate with one end thereof connected to the positive electrode;
a negative electrode current collector plate with one end thereof connected to the negative electrode;
a positive electrode external conductive member with one end thereof connected to another end of the positive electrode current collector plate and another end thereof extending to an outer side of the lid;
a negative electrode external conductive member with one end thereof connected to another end of the negative electrode current collector plate and another end thereof extending to the outer side of the lid;

the one end of the positive electrode external conductive member and the one end of the negative electrode external conductive member are respectively swage-fused to the other end of the positive electrode current collector plate and the other end of the negative electrode current collector plate; and an oxide layer is formed at a surface of each swage-fused area, wherein the one end of the swage-fused positive electrode external conductive member and the one end of the swage-fused negative electrode external conductive member each include a staged portion passing through the positive electrode current collector plate or the negative electrode current collector plate and projecting out through a surface of the positive electrode current collector plate or the negative electrode current collector plate; and the positive electrode external conductive member is fused with the positive electrode current collector plate at the staged portion and the negative electrode external conductive member is fused with the negative electrode current collector plate at the staged portion, with the oxide layer formed at the surface of each swage-fused area.

2. A secondary battery according to claim 1, wherein:
the oxide layer assumes a film thickness required to minimize wettability of a molten metal at the swage-fused area.

3. A secondary battery according to claim 1, wherein:
the positive electrode external conductive member includes;
  a positive electrode connector terminal with one end thereof swage-fused to the positive electrode current collector plate; and
  a positive electrode external terminal disposed on the outer side of the lid, with another end thereof passing through the positive electrode external terminal and the positive electrode connector terminal swage-fused with the positive electrode external terminal;
the negative electrode external conductive member includes;
  a negative electrode connector terminal with one end thereof swage-fused to the negative electrode current collector plate; and
  a negative electrode external terminal disposed on the outer side of the lid, with another end thereof passing through negative electrode external terminal and the negative electrode connector terminal swage-fused with the negative electrode external terminal; and
the oxide layer is formed at the surface of each swage-fused area where the positive or negative electrode connector terminal is swage-fused with the positive or negative external terminal.

4. A secondary battery according to claim 3, wherein:
the other end of the swage-fused positive electrode connector terminal and the other end of the swage-fused negative electrode connector terminal each include a staged portion projecting out through a surface of the positive electrode external terminal or the negative electrode external terminal; and
the positive electrode connector terminal is fused with the positive electrode external terminal at the staged portion and the negative electrode connector terminal is fused with the negative electrode external terminal at the staged portion, with the oxide layer formed at the surface of each swage-fused area.

5. A secondary battery according to claim 1, wherein:
the other end of the positive electrode external conductive member and the other end of the negative electrode external conductive member are each a terminal connected with the external load.

6. A secondary battery according to claim 1, wherein:
the surface of the swage-fused area assumes a projecting shape.

7. A secondary battery comprising:
a jelly roll that includes a positive electrode and a negative electrode wound via a separator;
a case housing the jelly roll;
a lid that seals the case; and
electrically conductive input/output members via which charge/discharge currents are input and output between the jelly roll and an external load, wherein:
the electrically conductive input/output members include, at least;
a positive electrode current collector plate with one end thereof connected to the positive electrode;
a negative electrode current collector plate with one end thereof connected to the negative electrode;
a positive electrode connector terminal with one end thereof connected to the positive electrode current collector plate;
a negative electrode connector terminal with one end thereof connected to the negative electrode current collector plate; and
a positive electrode external terminal disposed on an outer side of the lid, which is swage-fused with the positive electrode connector terminal with another end of the positive electrode connector terminal passing through the positive electrode external terminal;
a negative electrode external terminal disposed on the outer side of the lid, which is swage-fused with the negative electrode connector terminal with another end of the negative electrode connector terminal passing through the negative electrode external terminal; and
an oxide layer is formed at a surfaces of each swage-fused area where the positive or negative electrode connector terminal is swage-fused to the positive or negative electrode external terminal, wherein the other end of the swage-fused positive electrode connector terminal and the other end of the swage-fused negative electrode connector terminal each include a staged portion projecting out through a surface of the positive electrode external terminal or the negative electrode external terminal; and
the positive electrode connector terminal is fused with the positive electrode external terminal at the staged portion and the negative electrode connector terminal is fused with the negative electrode external terminal at the staged portion, with the oxide layer formed at the surface of each swage-fused area.

8. A secondary battery according to claim 7, wherein:
the surface of the swage-fused area assumes a projecting shape.

9. A secondary battery fabrication method through which a secondary battery according to claim 1 is manufactured, comprising:
a welding step in which the swage-fused area is formed through laser welding executed within an atmosphere containing oxygen with an oxygen concentration of 10% or higher.

10. A secondary battery fabrication method according to claim 9, wherein:
welding target members are exposed to air while undergoing laser welding in the welding step.

11. A secondary battery fabrication method according to claim 9, comprising:
- a first step in which the jelly roll is manufactured by winding the positive electrode and the negative electrode via the separator;
- a second step in which the positive electrode connector terminal and the negative electrode connector terminal are respectively swaged with the positive electrode current collector plate and the negative electrode current collector plate used to connect the positive electrode and the negative electrode to the positive electrode external terminal and the negative electrode external terminal respectively;
- a third step in which the positive electrode connector terminal and the negative electrode connector terminal are respectively swaged with the positive electrode external terminal and the negative electrode external terminal;
- a fourth step in which the positive electrode current collector plate and the negative electrode current collector plate are respectively connected to the positive electrode and the negative electrode;
- a fifth step in which swaged portions formed through the second step are welded in an oxygen-containing atmosphere with a specific oxygen concentration;
- a sixth step in which swaged portions formed through the third step are welded in an oxygen-containing atmosphere with a specific oxygen concentration;
- a seventh step in which a lid assembly is manufactured by connecting the lid-terminal assembly to the jelly roll, with the positive and negative electrode current collector plates, the positive and negative electrode connector terminals and the positive and negative electrode external terminals of the lid-terminal assembly having been integrated through the third through sixth steps;
- an eighth step in which the lid assembly is housed within a case that includes an opening;
- a ninth step in which the opening is covered with the lid to seal the case; and
- a tenth step in which an electrolyte is poured into the case.

* * * * *